US012620300B2

(12) United States Patent
Cooper et al.

(10) Patent No.: US 12,620,300 B2
(45) Date of Patent: May 5, 2026

(54) SHAFT CONTACT DEVICE

(71) Applicant: WAYNEDD ENTERPRISES LTD, Gosport (GB)

(72) Inventors: Wayne Cooper, Hampshire (GB); Edward Lau, Hampshire (GB)

(73) Assignee: WAYNEDD ENTERPRISES LTD, Gosport (GB)

( * ) Notice: Subject to any disclaimer, the term of this patent is extended or adjusted under 35 U.S.C. 154(b) by 0 days.

(21) Appl. No.: 18/832,922

(22) PCT Filed: Jan. 31, 2022

(86) PCT No.: PCT/IB2022/050825
§ 371 (c)(1),
(2) Date: Jul. 24, 2024

(87) PCT Pub. No.: WO2023/144593
PCT Pub. Date: Aug. 3, 2023

(65) Prior Publication Data
US 2025/0131813 A1 Apr. 24, 2025

(51) Int. Cl.
*G08B 21/20* (2006.01)
*B63B 45/04* (2006.01)
(Continued)

(52) U.S. Cl.
CPC .............. *G08B 21/20* (2013.01); *B63B 45/04* (2013.01); *B63B 79/10* (2020.01); *H01R 39/60* (2013.01); *C23F 13/005* (2013.01)

(58) Field of Classification Search
CPC ......... G08B 21/20; B63B 45/04; B63B 79/10; H01R 39/60; C23F 13/005
See application file for complete search history.

(56) References Cited

U.S. PATENT DOCUMENTS

| | | | |
|---|---|---|---|
| 3,049,479 | A | 8/1962 | Preiser et al. |
| 3,385,254 | A | 5/1968 | Goldberg et al. |

(Continued)

FOREIGN PATENT DOCUMENTS

| | | | |
|---|---|---|---|
| CN | 203567911 | U | 4/2014 |
| CN | 112531362 | A | 3/2021 |

(Continued)

OTHER PUBLICATIONS

"Notification of Transmittal of the International Search Report and the Written Opinion of the International Searching Authority, or the Declaration", in PCT/IB2022/050825, dated Oct. 20, 2022.

(Continued)

*Primary Examiner* — Mohamed Barakat
(74) *Attorney, Agent, or Firm* — William H. Bollman

(57) ABSTRACT

The invention relates to a shaft contact device 1 to make an electrical connection between a shaft and an earth point. Device 1 has a bracket 10 for connection to a point spaced from the rotating shaft, base member 20 mounted on the bracket 10, a head member 30 having at least one electrically conductive brush 34A, 34B to engage the shaft. A pair of arms 40A, 40B each has a first end connected to spaced pivot points on the base member and a second end connected to spaced pivot points on the head member. A spring means 50 biases the head towards the shaft to engage the brush on the shaft.
In use the base member, head member and spaced arms forming a parallelogram arm whereby the head member brushes contact the shaft at a constant angle as the brushes are worn.

22 Claims, 4 Drawing Sheets

(51) Int. Cl.

| | |
|---|---|
| ***B63B 79/10*** | (2020.01) |
| ***H01R 39/60*** | (2006.01) |
| *C23F 13/00* | (2006.01) |

(56) References Cited

U.S. PATENT DOCUMENTS

| | | | | |
|---|---|---|---|---|
| 4,950,462 | A * | 8/1990 | Nakao | C01B 32/40 423/246 |
| 5,052,962 | A | 10/1991 | Clark | |
| 6,559,571 | B1 | 5/2003 | Klode | |
| 9,758,879 | B1 * | 9/2017 | Skrzypchak | C23F 13/18 |
| 10,011,910 | B2 * | 7/2018 | Phillips | C25B 1/04 |
| 11,189,151 | B2 * | 11/2021 | Artzt | G08B 21/088 |
| 2004/0045581 | A1 * | 3/2004 | Boomgaarden | E01H 1/056 15/82 |
| 2015/0274267 | A1 * | 10/2015 | Deven | B63B 45/04 29/850 |
| 2020/0309673 | A1 * | 10/2020 | Elder | G01N 17/00 |
| 2021/0273530 | A1 * | 9/2021 | Pössnicker | H02K 11/35 |
| 2022/0266971 | A1 * | 8/2022 | Kraus | B63H 21/21 |

FOREIGN PATENT DOCUMENTS

| | | | |
|---|---|---|---|
| DE | 102010042804 | A1 | 4/2012 |
| GB | 503946 | A | 7/1937 |
| GB | 1462931 | A | 1/1977 |
| JP | 2014033493 | A | 2/2014 |
| WO | 2021073759 | A1 | 4/2021 |

OTHER PUBLICATIONS

"Patent Act 1977: Search Report under Section 17" in GB2011487.2, dated Dec. 17, 2020.

* cited by examiner

SHAFT CONTACT DEVICE

FIELD

The present invention relates to a shaft contact device and system. More particularly, but not exclusively, to a shaft with a contact means for use with a marine corrosion protection system.

BACKGROUND

It is common practice to use sacrificial anodes on boats to prevent metallic components from corroding due to electrolysis. Propeller drive shafts, propellers and gearboxes are connected electrically linked and damage to these by electrolysis can be very costly.

PRIOR ART

United States patent U.S. Pat. No. 5,052,962 (CLARK) discloses a corrosion reducer for use with ships having a propeller mounted on a propeller shaft which extending through the hull. The corrosion reducer includes a current collector and a current reduction assembly for reducing the voltage between the hull and shaft to reduce corrosion due to electrolytic action.

United Kingdom patent application GB 1 462 931 (SKARPENORD) describes a cathodic protection for a ship's propeller which has a liner sleeve on the shaft and a layer of electrical insulation between the sleeve and shaft to insulate the shaft from the metal hull of the ship in which the shaft is installed.

United Kingdom patent application GB 503 946 (LEPAGE) describes a device which prevents corrosion of condensers, propellers and other parts of ships in contact with sea water. A positive terminal of a continuous current generator is connected through variable resistances to iron anodes within, but insulated from, the condenser or similar components in the cooling circuit of an internal combustion engine.

United States patent U.S. Pat. No. 3,049,479 (PREISER) discloses a method of electrically protecting a propeller against corrosion and cavitation in a sea water electrolyte by rendering the propeller as a cathode and locating the anode relative to the propeller such that a significant amount of electric current passes through the sea water electrolyte.

United States patent U.S. Pat. No. 3,385,254 (Goldberg et al) discloses a system for boat electrolysis and a static electric eliminator which comprises a propeller shaft journaled therethrough. A current conducting brush has a portion of which contacts the shaft and a common electrical earth is provided in the boat.

The invention seeks to provide a shaft contact device to connect a drive shaft, propeller and gearbox electrically to a sacrificial anode.

SUMMARY OF THE INVENTION

According to a first aspect of the present invention there is provided a shaft contact device to make an electrical connection between a shaft and an earth point comprising: a bracket for connection to a point spaced from the rotating shaft; a base member mounted on the bracket; a head member having at least one electrically conductive brush to engage the shaft; a pair of arms each having a first end connected to spaced pivot points on the base member and a second end connected to spaced pivot points on the head member, and a spring means to bias the head towards the shaft to engage the brush on the shaft, in use the base member, head member and spaced arms forming a parallelogram arm whereby the head member brushes contact the shaft at a constant angle as the brushes are worn.

Preferably the bracket is adapted to be mounted on a seal through which the shaft extends. The bracket may be mounted on the seal using cable ties, screws, bolts or other attachments means. Slots may be provided on the bracket to accommodate the cable ties.

Preferably the bracket comprises synthetic plastics portions and is heat deformable to enable its shape to be adjusted easily and so that it may rest or be placed against different parts of a boat or to adopt the shapes at a point to which it is to be attached.

Preferably the spring means spans opposing corners of the parallelogram arm defined by arms and spaced pivot points.

In some embodiments the arms have elongate recesses to accommodate the spring when the arms come together adjacent each other.

Preferably the at least one brush is wired to a terminal to connect with a wire leading to an earth point, such as an anode. Optionally the brush may be wired to a current control means and/or a current sensing device.

Preferably the head includes an electrically conductive contact member adjacent the base of the brush which engages the shaft when the brushes are worn.

In some embodiments an alarm circuit is provided to generate and issue an alarm when the contact member engages the shaft to indicate that brush/es need replacing.

According to a second aspect of the present invention there is provided a system which includes the shaft contact device and an alarm circuit connected to a wireless transmitter which is operative to transmit an alert signal to a remote location.

Optionally the system includes a wireless receiver which is configured to receive the alert signal and to display or relay a warning to indicate when the brushes are worn.

The brushes may include a portion of material which alters an electrical characteristic when length of brushes are worn or reach a specific length and a sensor is provided which detects a variation in an electrical characteristic.

Alternatively a sensor may be provided to detect a variation in a mechanical characteristic when length of brushes are worn or reach a specific length.

A sensor may be provided with the alarm circuit to operate a second alarm if water is present between the contact member and the terminal to indicate if there is leakage between the shaft and shaft seal.

Preferably the first and/or second ends of the arms are able to be connected to one of a number of spaced pivot points to enable adjustment of the angle of the head member relative to the base member.

An embodiment of the invention will now be described, by way of example only, and with reference to the Figures in which:

DETAILED DESCRIPTION OF PREFERRED EMBODIMENTS OF THE INVENTION

Figure 1:
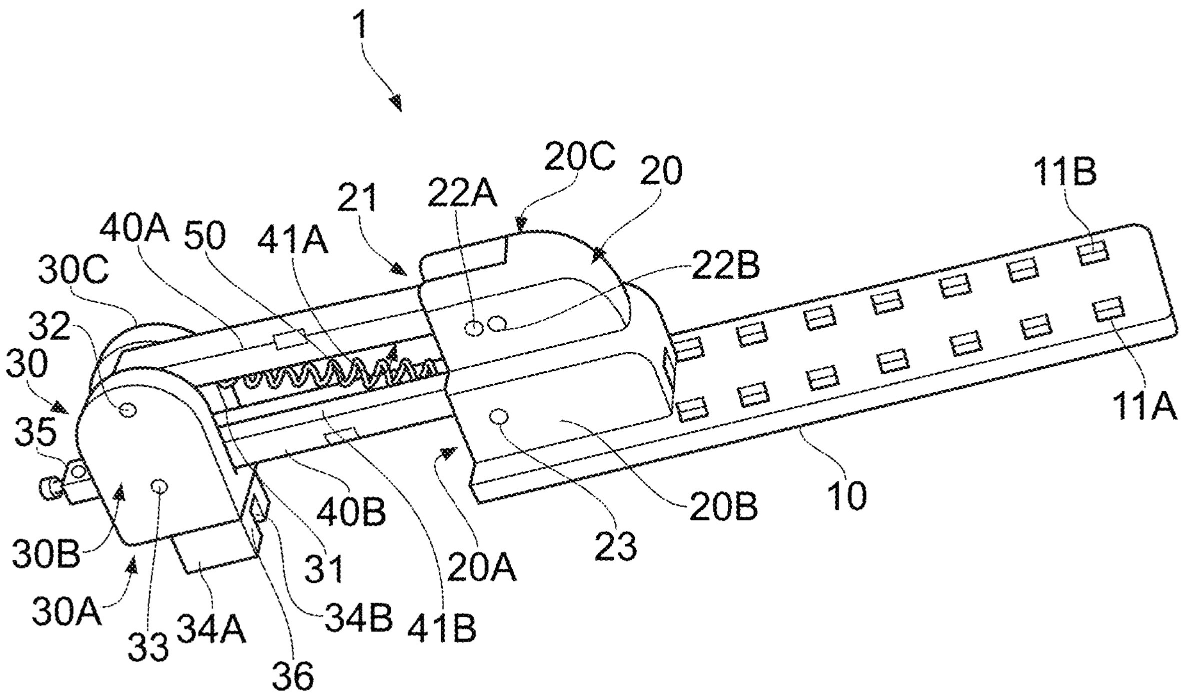
FIG. 1 shows a perspective view of a shaft contact device.

Referring to FIG. 1 there is shown a shaft contact device 1 to make an electrical connection between a shaft and an earth point such as a sacrificial anode.

Figure 2:
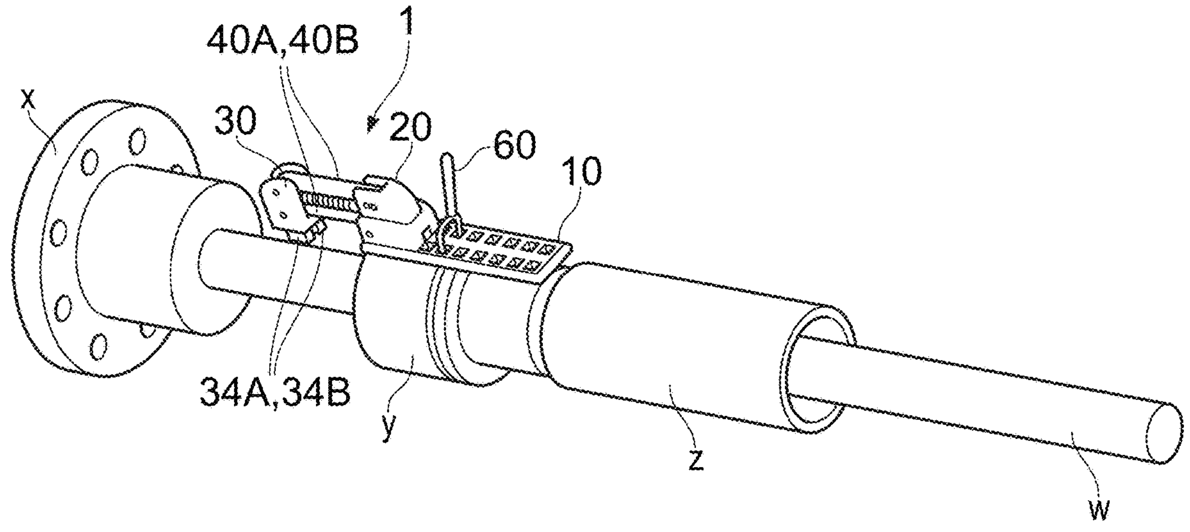
FIG. 2 shows a view of the shaft contact device in use on a boat.

Device 1 has a bracket 10 for connection to a point spaced from the shaft, such as a shaft seal for example a stern gland Y (see FIG. 2 of a type well known in the art). Bracket 10 may be in the form of a rectangular plate of heat deformable plastics material allowing it to be shaped to accommodate different shapes at the spaced point to which it is to be attached (such as seal W). A number of pairs of slots 11A, 11B are provided to receive cable ties to secure the bracket to a seal or other surface.

A base member 20 is mounted on the bracket 10. Bracket 20 has a slot 21 on a front face 20A. On opposing side walls 20B, 20C are first pin holes 22A, 22B and second 23 pin hole to receive pins (not shown) to create a pivots for a pair of arms 40A, 40B (see below).

A head member 30 is provided. A slot 31 is provided between opposing head side walls 30B, 30C. On opposing side walls 30B, 30C are first pin hole 32 and second 33 pin hole to receive pins (not shown) to create a pivots for the pair of arms 40A. 40B (see below).

Head member 30 has, projecting from a lower face 30A, a pair of electrically conductive brushes 34A, 34B to engage the shaft. The brushes 34A, 34B are wired to a terminal 35 to connect with a wire leading to an earth point such as an anode.

A pair of arms 40A, 40B each have a first end connected to spaced pivot points 22A, 23 on the base member 20, and a second end connected to spaced pivot points 32, 33 on the head member 30. The pivot points 22A, 23 and 32, 33 are spaced the same distance so that the arms 40A, 40B always remain parallel as they pivot. Arms 40A, 40B each have an elongate slot 41A, 41B.

Spring means in the form of a coil spring 50 is connected at end to the second end of arm 40A and the first end of arm 40B to bias the head downwards as shown in the drawing towards or through the plane of the base. The spring means thus spans opposing corners of the parallelogram defined by the arms and the spaced pivot points. As the arms pivot relative to the base 20, they move towards and away from each other. When they come together the spring is accommodated in the elongate slots 41A, 41B.

As shown in FIG. 2, device 1 may ideally be used in a boat engine installation. In FIG. 2, a rotating shaft W is coupled to a gearbox through a coupling X. Shaft W extends through a stern tube in boat hull, and has a propeller mounted on a free end of the shaft as is known in the art and not shown. A seal in the form of stern gland Y surrounds the shaft V is connected to one end of flexible sleeve Z through which the shaft also passes. The other end of sleeve Z is sealed against the boat hull (not shown).

Device 1 of FIG. 1 has its base heat moulded to the shape of and mounted on gland Y. Device 1 is held in place on gland Y with one or more cable ties 60 passing through slots 11A, 11B.

In use the base member, head member 30 and spaced arms 40A, 40B forming a parallelogram arm whereby the head member brushes contact the shaft at a constant angle (such as normal to the shaft V) as the brushes are worn. Head member is also at a fixed angle relative to the base member 20.

In some circumstances it may be necessary to adjust the angle of the head to the base member, in which case the first end of pivot arm 40A can be secured to pivot point 22B. If desired pivot point 22B could be in a different location or more than one additional pivot point 22B may be provided. Any pivot point would preferably be spaced the same distance to pivot point 23 and pivot point 22A. Thus the first and/or second ends of the arms can be connected to one of a number of spaced pivot points to adjust the angle of the head member relative to the base member.

Preferably the head includes an electrically conductive contact member 36 adjacent the base of the brush/es which engages the shaft when the brushes are worn. Preferably an alarm circuit is provided to generate an alarm when the contact member engages the shaft to indicate that brush/es need replacing.

Preferably an alarm circuit is provided to operate an alarm if water is present between the contact member and the terminal to indicate that the shaft seal W is leaking.

Figure 3:
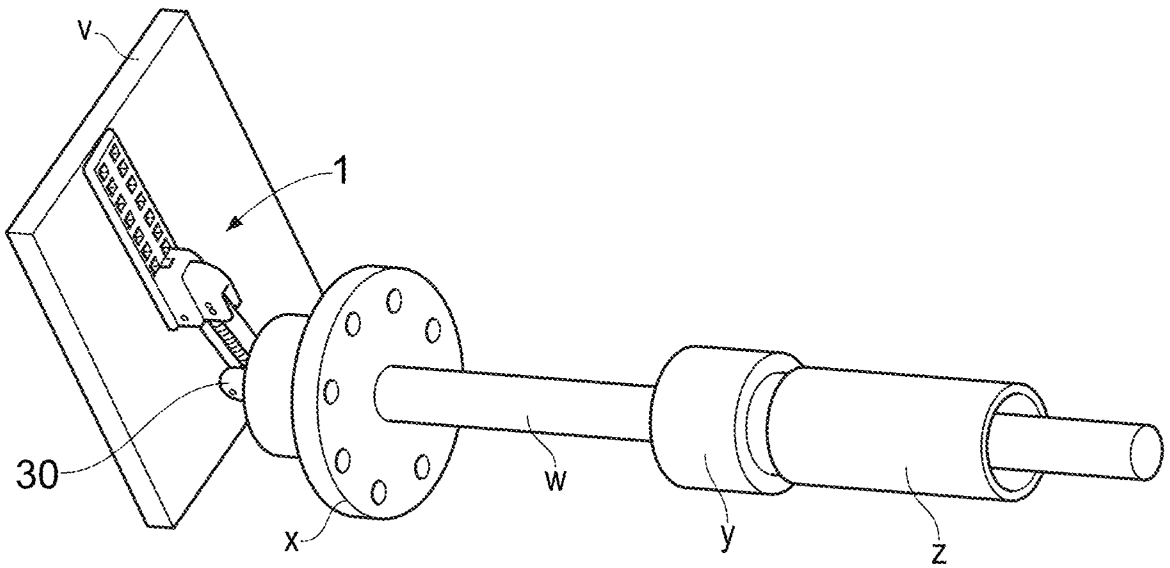
FIG. 3 shows a view of the shaft contact device in alternative use on a boat.

As shown in FIG. 3, device 1 may be mounted on a bulkhead U and may be used so that the brush/es on head 30 engage the end of coupling X. Although the head 30 is shown in FIGS. 1 and 2 biased towards or through the plane of base 10, in this FIG. 3 the head 30 is rotated 180 degrees relative to the ends of 40A, 40B so that it is biased by the spring means in the opposite direction.

Figure 4:
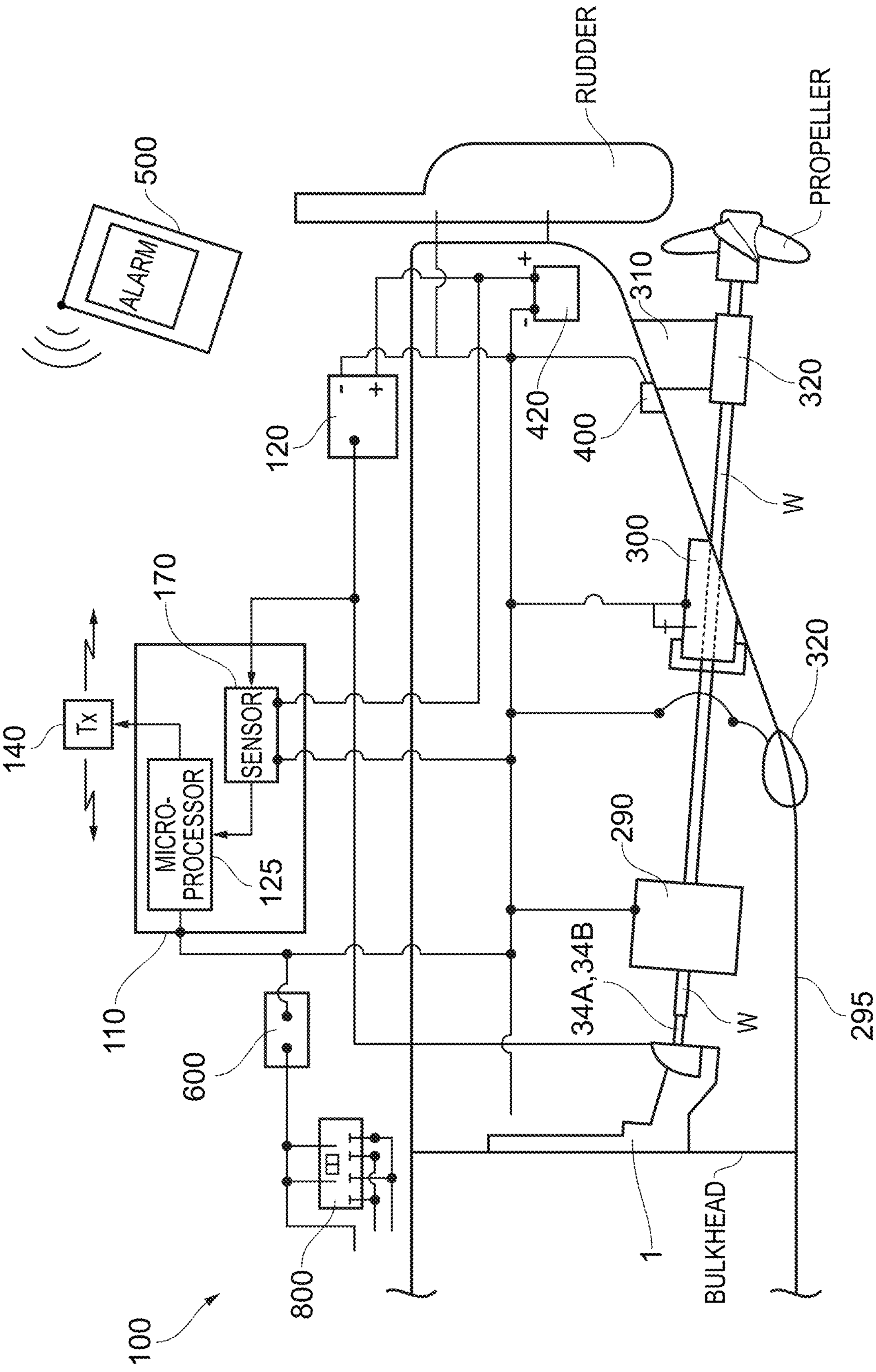
FIG. 4 is an overall diagrammatic view of the shaft contact device in use on a boat and a system with an alarm circuit connected to a wireless transmitter and a wireless receiver at a remote location.

FIG. 4 is an overall diagrammatic view of the shaft contact device, as herein described, in use on a boat 100 and with a system 110 with an alarm circuit 120. The system 110 comprises a microprocessor 125 which is connected to a sensor 170 and optionally to a wireless transmitter 140. The embodiment in FIG. 4 shows how the system 110 is integrated with existing electrical wiring harness via a galvanic isolator 600 and an AC shore power coupling 800.

Shaft W is driven from a gearbox 290 and passes through the hull 295 through a stern seal gland 300. A bracket 310 supports the shaft W, for example in a cutlass bearing 320. The pair of electrically conductive brushes 34A, 34B contact end of shaft W and are connected to the alarm 120. Sensor 170 is connected to a common anode 320 and negative terminal of battery 420.

In one embodiment the brushes 34A, 34B include a material which alters an electrical characteristic when they are worn or reach a specific length. When this occurs sensor 170 detects a variation in an electrical characteristic and a signal is received by the microprocessor 125. In an alternative embodiment the sensor 170 detects a variation in a mechanical characteristic of the brushes when they are worn or reach a specific length and send a signal to the microprocessor 125.

The alarm circuit 120 is operated upon receipt of an alarm signal from sensor 170 and from microprocessor 125. Microprocessor 125 is also connected to a wireless transmitter 140 which sends a signal to a wireless receiver 150, which may be in the wheelhouse (not shown) or on the bridge (not shown) of the boat or on a mobile communication device, such as smartphone 500, displays an alert to indicate that the brushes 34A, 34B are wearing and need to be replaced.

Sensor 400 is connected to the alarm circuit 120 and operates a second alarm indicating if water is present in a bilge or to indicate if there is leakage between the shaft W and a shaft seal, such as the stern seal gland 300.

Optionally the receiver 150 is at a remote location is a smartphone configured to receive an alert and to display a suitable warning message or to send a warning message as a short message service (SMS) alert or as an email to a recipient, such as an operator or maintenance manager.

The invention may take a form different to that specifically described above and it will be appreciated that modifications, apparent to those skilled in the art, may be made without departing from the scope of protection as defined by the claims.

The invention claimed is:

1. A shaft contact device to make an electrical connection between a rotating shaft and an earth point comprising:

- a bracket for connection to a point spaced from the rotating shaft;
- a base member mounted on the bracket;
- a head member having at least one electrically conductive brush to engage the rotating shaft;
- a pair of arms each having a first end connected to spaced pivot points on the base member and a second end connected to spaced pivot points on the head member, and
- a spring means to bias the head towards the rotating shaft to engage the at least one electrically conductive brush on the rotating shaft, in use the base member, head member and spaced arms forming a parallelogram arm whereby the at least one electrically conductive brush of the head member contacts the rotating shaft at a constant angle as the at least one electrically conductive brush is worn.

2. The shaft contact device according to claim 1, wherein the bracket is adapted to be mounted on a connection point through which the rotating shaft extends.

3. The shaft contact device according to claim 1, wherein the bracket is connected to a connection point using one or more cable ties.

4. The shaft contact device according to claim 3, wherein slots are provided on the bracket to accommodate the one or more cable ties.

5. The shaft contact device according to claim 1, wherein the bracket is of plastics and heat deformable to adjust its shape to lie adjacent different shapes at the spaced point to which it is to be attached.

6. The shaft contact device according to claim 1, wherein the spring means spans opposing corners of a parallelogram defined by the arms and the spaced pivot points.

7. The shaft contact device according to claim 1, wherein the arms have elongate recesses to accommodate the spring means when the arms come together adjacent each other.

8. The shaft contact device according to claim 1, wherein the at least one electrically conductive brush are wired to a terminal to connect with a wire leading to an earth point anode or cathode.

9. The shaft contact device according to claim 1, wherein the head includes an electrically conductive contact member adjacent the base member of the at least one electrically conductive brush which engages the rotating shaft when the brushes become worn.

10. The shaft contact device according to claim 9, wherein an alarm circuit is provided to generate an alarm when the contact member engages the rotating shaft to indicate that the at least one electrically conductive brush needs replacing.

11. The shaft contact device according to claim 8, wherein an alarm circuit is provided to operate an alarm if water is present between an electrically conductive contact member and the terminal to indicate that a seal around the rotating shaft is leaking.

12. The shaft contact device according to claim 1, wherein the first and/or second ends of the arms are adapted to be connected to one of a number of spaced pivot points to adjust the constant angle of the head member relative to the base member.

13. A marine engine with a prop shaft or drive shaft, incorporating the shaft contact device according to claim 1.

14. A system which includes the shaft contact device according to claim 8 and an alarm circuit which is operatively connected to a wireless transmitter which in use transmits an alert signal to a remote location upon receipt of a signal from a sensor.

15. The system according to claim 14 wherein the sensor detects that the at least one electrically conductive brush is worn.

16. The system according to claim 15 wherein a wireless receiver is configured to receive the alert signal and to display or relay a warning to indicate that the at least one electrically conductive brush is worn.

17. The system according to claim 15 wherein the sensor detects a variation in an electrical characteristic to indicate that the at least one electrically conductive brush is worn.

18. The system according to claim 15 wherein the sensor detects a variation in a mechanical characteristic to indicate that the at least one electrically conductive brush is worn.

19. The system according to claim 11 wherein a sensor detects if water is present between the electrically conductive contact member and the terminal or in a bilge to indicate if there is leakage between the rotating shaft and shaft seal.

20. A marine craft or vessel including the device according to claim 1.

21. A marine craft or vessel including the marine engine according to claim 13.

22. A marine craft or vessel including the system according to claim 14.

* * * * *